United States Patent
Lakshman et al.

(10) Patent No.: US 9,014,181 B2
(45) Date of Patent: Apr. 21, 2015

(54) SOFTROUTER SEPARATE CONTROL NETWORK

(75) Inventors: Tirunell V. Lakshman, Morganville, NJ (US); Krishan K. Sabnani, Westfield, NJ (US); Thomas Y. Woo, Red Bank, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 1311 days.

(21) Appl. No.: 11/147,937

(22) Filed: Jun. 8, 2005

(65) Prior Publication Data

US 2006/0092976 A1   May 4, 2006

Related U.S. Application Data

(60) Provisional application No. 60/623,885, filed on Nov. 1, 2004.

(51) Int. Cl.
| | |
|---|---|
| H04L 12/50 | (2006.01) |
| H04L 12/703 | (2013.01) |
| H04L 12/715 | (2013.01) |
| H04L 12/721 | (2013.01) |
| H04L 12/707 | (2013.01) |
| H04L 12/773 | (2013.01) |

(52) U.S. Cl.
CPC ............. *H04L 45/28* (2013.01); *H04L 45/04* (2013.01); *H04L 45/123* (2013.01); *H04L 45/22* (2013.01); *H04L 45/60* (2013.01)

(58) Field of Classification Search
USPC ........................................................ 370/387
See application file for complete search history.

(56) References Cited

U.S. PATENT DOCUMENTS

| | | |
|---|---|---|
| 6,345,315 B1 | 2/2002 | Mishra |
| 6,633,560 B1 | 10/2003 | Tiwari et al. |

(Continued)

FOREIGN PATENT DOCUMENTS

| | | |
|---|---|---|
| EP | 1 152 631 A | 11/2001 |
| EP | 05 25 6621 | 1/2006 |

(Continued)

OTHER PUBLICATIONS

"Forwarding and Control Element Separation (ForCES) Framework", L. Yang et al., Apr. 2004, Network Working Group, Request for Comments: 3746.*

(Continued)

*Primary Examiner* — Peter Cheng
(74) *Attorney, Agent, or Firm* — Wall & Tong LLP

(57) ABSTRACT

An embodiment of the exemplary SoftRouter architecture includes two physically separate networks, a control plane network and a data plane network. The data plane network is one physical network for the data traffic, while the control plane network is another physical network for the control traffic. The topology of the data plane network is made up of interconnected forwarding elements (FEs). The topology of the control plane network is made up interconnected control elements (CEs). This physical independence of the control plane network from the data plane network provides for a secure mechanism to communicate among the CEs in the control plane network. In addition, this physical independence provides improved reliability and improved scalability, when compared to the traditional router architecture, where control plane message are in-band with the data plane.

41 Claims, 6 Drawing Sheets

(56) References Cited

U.S. PATENT DOCUMENTS

| | | |
|---|---|---|
| 6,697,329 B1 | 2/2004 | McAllister et al. |
| 6,912,197 B2 | 6/2005 | Mahamuni |
| 7,069,343 B2 | 6/2006 | Goringe et al. |
| 7,075,904 B1 | 7/2006 | Manish et al. |
| 7,190,896 B1 | 3/2007 | Wang et al. |
| 7,194,653 B1 | 3/2007 | Hadders et al. |
| 7,197,664 B2 | 3/2007 | Khosravi |
| 7,286,468 B2 | 10/2007 | Scudder et al. |
| 7,324,439 B2 | 1/2008 | Loo |
| 7,353,259 B1 | 4/2008 | Bakke et al. |
| 7,428,219 B2 | 9/2008 | Khosravi |
| 8,068,408 B2 | 11/2011 | Ansari et al. |
| 2002/0171886 A1 | 11/2002 | Wu et al. |
| 2002/0191250 A1 | 12/2002 | Graves et al. |
| 2003/0028641 A1 | 2/2003 | Zhang et al. |
| 2003/0069975 A1 | 4/2003 | Abjanic et al. |
| 2003/0208585 A1* | 11/2003 | Shinomiya et al. ........... 709/223 |
| 2004/0131079 A1 | 7/2004 | Hegde et al. |
| 2004/0264384 A1* | 12/2004 | Deval et al. .................... 370/252 |
| 2005/0050136 A1* | 3/2005 | Golla ............................. 709/200 |
| 2005/0190783 A1* | 9/2005 | Khosravi ...................... 370/438 |
| 2005/0254438 A1 | 11/2005 | Turk et al. |
| 2008/0165686 A1* | 7/2008 | Lake et al. .................... 370/231 |
| 2012/0239626 A1* | 9/2012 | Aysan et al. .................. 707/674 |

FOREIGN PATENT DOCUMENTS

| | | |
|---|---|---|
| JP | 2000-253053 | 9/2000 |
| JP | 2002-026990 | 1/2002 |
| JP | 2003-318899 | 11/2003 |
| JP | 2003-110613 | 11/2004 |

OTHER PUBLICATIONS

Furquan Ansari Thyaga Nandagopal Lucent Tech Hormuzd Khosravi Intel Corp: "ForCES Element Bindings and Topology Discovery Protocol" IETF Standard-Working-Draft, Internet Engineering Task Force, IETF, CH, Jul. 10, 2004, XP015010189 ISSN: 0000-0004.

Tal Lavian et al: "Intelligent network services through active flow manipulation" Intelligent Network Workshop, 2001 IEEE May 6-9, 2001, Piscataway, NJ, USA, IEEE, May 6, 2001, pp. 73-82, XP010538403 ISBN : 0-7803-7047-3.

Yang L et al: "RFC 3746: Forwarding and Control Element Separation (ForCES) Framework" Forces Working Group, Apr. 2004, XP002323740.

A. Lazar, "Programming Telecommunication Networks," IEEE Network, vol. 11, Sep./Oct. 1997, pp. 8-18.

S. Williams, "The Softswitch Advantage," IEE Review, vol. 48, Issue 4, Jul. 2002, pp. 25-29.

J. Rexford et al., "Network-Wide Decision Making: Toward a Wafer-Thin Control Plane," HotNets, 2004.

L. Yang et al., "Forwarding and Control Element Separation (ForCES) Framework," RFC 3746, 2004.

Gopal, Ram, "Seperation of Control and Forwarding Plane Inside a Network Element," High Speed Networks and Multimedia Communications 5th IEEE International Conference. Nov. 7, 2002. pp. 161-166.

Chan, Vien et al., "Control Plane Platform Development Kit (CP-PDK)—Integrating Control Plane and Data Plane," Intel Corporation. Feb. 19, 2003.

R. Gopal et al., "ForwArding and Control ElemenT Protocol (FACT)," Nov. 2003, IETF Draft (draft-gopal-forces-fact-06.txt).

Louati, Wajdi et al., "Configurable Software-Based Edge Router Architecture," 4th Workshop on Applications and Services in Wireless Networks. Aug. 2004.

U.S. Appl. No. 11/147,642, filed Jun. 8, 2005, Lakshman et al.
U.S. Appl. No. 11/147,472, filed Jun. 8, 2005, Ansari et al.
U.S. Appl. No. 11/147,665, filed Jun. 8, 2005, Ansari et al.
U.S. Appl. No. 11/147,788, filed Jun. 8, 2005, Lakshman et al.
U.S. Appl. No. 11/147,491, filed Jun. 8, 2005, Ansari et al.

Forwarding and Control Element Separation (ForCES) Framework, RFC 3746 by Yang et al., Apr. 30, 2004.

Nov. 10, 2010 Office Action in JP 2005-318015, Alcatel-Lucent USA Inc., Applicant, 3 pages.

Nov. 22, 2010 Office Action in JP 2005-318066, Alcatel-Lucent USA Inc., Applicant, 4 pages.

Apr. 26, 2012 Office Action in KR 10-2005-0102888, Alcatel-Lucent USA Inc., Applicant, 5 pages.

Yang et al., RFC3746, "Forwarding and Control element Separation (ForCES) Framework," Apr. 2004, Forces Working Group (Apr. 2004), http://tools.ietf.org/rfc/rfc3746.txt.

Khosravi et al., RFC 3654 ForCES Requirements, Nov. 2003.

Oct. 16, 2012 Office Action in JP 2005-317886, Alcatel-Lucent USA Inc., Applicant, 5 pages.

Aug. 5, 2011 Office Action in JP 2005-317886, Alcatel-Lucent USA Inc., Applicant, 2 pages.

Oct. 26, 2010 Office Action in JP 2005-317886, Alcatel-Lucent USA Inc., Applicant, 3 pages.

Watanabe, et al., "Method of constructing a backbone architecture of next-generation computer network", pp. 435-444, published on Apr. 10, 1998 by Telecommunication Association, NTT R&D vol. 47, No. 4.

May 9, 2012 Office Action in KR 10-2005-0104005, Alcatel-Lucent USA Inc., Applicant, 4 pages.

Apr. 6, 2012 Office Action in KR-10-2005-0102998, Alcatel-Lucent USA Inc., Applicant, 4 pages.

Ansari, et al., Element Bindings and Topology Discovery Protocol—(Slides), 11 pages, May 20, 2009.

Lin et al., Multihop Wireless IEEE 802.11 LANs: A Prototype Implementation, IEEE int. Conf., vol. 3, 7 pages, Aug. 17, 2000.

Jun. 20, 2013 Office Action in IN Application No. 1583/CHE/2005, Alcatel-Lucent, Applicant, 3 pages.

Jul. 23, 2013 Office Action in IN Application No. 1578/CHE/2005, Alcatel-Lucent, Applicant, 2 pages.

Gregersen, Kristian, NPF Network Processing Forum, IPv6 Unicast Forwarding Service API Implementation Agreement, Revision 2, Copyright 2004, 116 pages; retrieved from the internet http://www.oiforum.com/public/documents/IPv6-Rev2_IA.pdf on Aug. 21, 2013.

Jul. 16, 2013 Appeal Examiner's Refusal Decision in JP 2005-317886, Alcatel-Lucent USA Inc., Applicant, 14 pages.

"IPv6 Unicast Forwarding Service API Implementation Agreement, Revision 2.0" Network Processing Group, 'Online May 26, 2004, pp. 1-11, XP002362393 Retrieved from the Internet: URL:HTTP://www.npforum.org/techinfo/IPv4-IA.pdf>'retrieved on Jan. 11, 2006.

Jun. 17, 2013 Office Action in IN Application No. 1577/CHE/2005, Lucent Technologies Inc., Applicant, 3 pages.

Jun. 4, 2013 Office Action in IN Application No. 1581/CHE/2005, Lucent Technologies Inc., Applicant, 3 pages.

* cited by examiner

SOFTROUTER SEPARATE CONTROL NETWORK

CROSS-REFERENCES

The present application claims the benefit of provisional application No. 60/623,885, entitled "SoftRouter: Router Disaggregation," filed Nov. 1, 2004. In addition, the present application is related to copending application Ser. No. 11/147,642, entitled "SoftRouter," Ser. No. 11/147,472, entitled "SoftRouter Protocol Disaggregation," Ser. No. 11/147,665, entitled "SoftRouter Protocol Failovers," Ser. No. 11/147,768, entitled "SoftRouter Feature Server," Ser. No. 11/147,491, entitled "SoftRouter Dynamic Binding Protocol," which were filed on the same date as the present application, Jun. 8, 2005. The provisional and related applications are incorporated herein by reference in their entireties.

FIELD OF THE INVENTION

The present invention relates generally to the field of networking and, in particular, relates to separate control and data networks.

BACKGROUND OF THE INVENTION

Traditional router architectures are becoming increasingly complex today as more and more features are being added to the Internet control plane. Many operational tasks such as routing policy enforcement or traffic engineering require network-wide control that is difficult and cumbersome to achieve in a network of autonomous and complex routers. Moreover, current routers have the route controllers tightly coupled with the forwarding engine and this static binding often results in shared failures.

Despite the end-to-end architecture design principle that aims at a simple core network, traditional router architectures have gotten increasingly complex today. As new features are being defined in internet engineering task force (IETF) requests for comments (RFCs), more and more control plane complexity is being added at the routers. These features include routing (e.g., BGP-based MPLS-VPNs), traffic engineering (e.g., OSPF-TE), security, and the like. In fact, the code complexity of an IP router now rivals that of a telephony switch. In contrast, the forwarding path implementation has progressively become easier with rapid advances in large-scale hardware integration (e.g., ASIC) and ready availability of off-the-shelf chips.

Traditional IP networks are constructed using routers that operate relatively autonomously. The high complexity is present at many points all over the network. This has many undesirable consequences. First, the multiple points of control significantly increase operational complexity (e.g., misconfiguration). Second, in certain circumstances, uncoordinated actions of these autonomous routers can lead to sub-optimal performance (e.g., poor recovery time) at best and network instability in the worst case. Finally, the introduction of new features may require upgrades to a large number of routers, which is both complex and error-prone.

Traditional router architectures have integrated control and forwarding. The control processors implementing control plane functions are co-located with the line cards that implement forwarding functions and often share the same router backplane. The control processors provide control functions only to the co-located line cards, and vice-versa, leading to a scenario where the line cards cannot be managed when there is a failure of the co-located controller(s).

SUMMARY

Various deficiencies of the prior art are addressed by the present invention of an exemplary SoftRouter architecture with a separate control network, which has many embodiments.

One embodiment is a network architecture, including a data plane, a control plane, and an interface. The data plane is a network for carrying data traffic. The data plane includes interconnected forwarding elements (FEs). The control plane is another network for control traffic that is physically remote from the data plane. The control plane includes interconnected control elements (CEs). Each CE controls at least two of the FEs. Each CE is dynamically bound to its controlled FEs. The interface between the data plane and control plane uses a standard protocol. Communication between the CEs is private.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

The invention will be primarily described within the general context of an embodiment of an exemplary SoftRouter architecture, however, those skilled in the art and informed by the teachings herein will realize that the disaggregation concept may be used to generate various other embodiments of network architectures and that the invention is applicable to local area networks (LANs), metropolitan area networks (MANs), wide area networks (WANs), and other networks, such as those using open systems interconnection (OSI) layers, bridging protocols, many other protocols, traffic management, optical, edge/core routing, wireless, cable, data centers, fault management, configuration management, accounting management, performance management, security management, other network management, enterprise, government, military applications, and many other different kinds of networking characteristics and applications.

Figure 1:
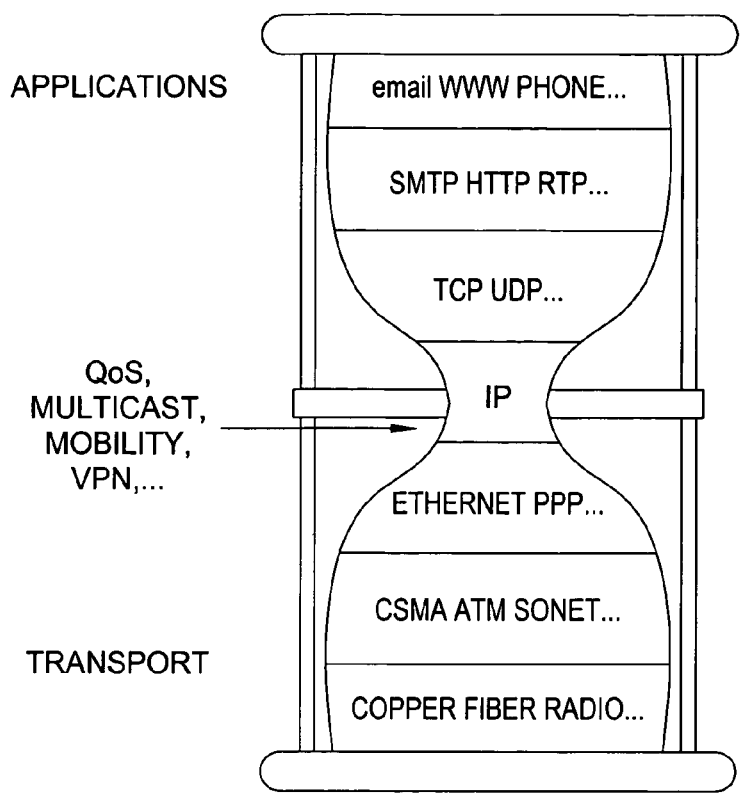
FIG. 1 illustrates the problem of emerging applications adding more functions to the IP network layer.

Internet protocol (IP) provides end-to-end datagram delivery service to higher-layer protocols and applications and can use any link-layer technology that delivers packets. FIG. 1 illustrates the problem of emerging applications adding more functions to the IP network layer, expanding the middle of the hour glass. These emerging applications and protocols include email, www phone, simple mail transfer protocol (SMTP), hypertext transfer protocol (HTTP), real-time protocol (RTP), transmission control protocol (TCP), user datagram protocol (UDP), and other protocols, which involve quality of service (QoS), multicast, mobility, virtual private network (VPN), and other features. IP datagrams are transported using Ethernet, point-to-point protocol (PPP), carrier sense multiple access (CSMA), asynchronous transfer mode (ATM), synchronous optical network (SONET), and other lower-layer protocols over copper, fiber, radio, and other physical transport means. Traditional router architectures try to incorporate all of the new IP functions into routers, resulting in duplication of complex functions in multiple routers of a network. This also increases capital and operational expenses. In general, there is a need to reduce the complexity and expense of operating a network of routers.

Many new features are being added to routers, e.g. border gateway protocol (BGP) extensions for VPNs, multiprotocol label switching (MPLS)-based VPNs, and traffic engineering (TE). Traditional router architectures have five to ten million lines of code and complexity is spread throughout the network. Achieving an operator's network-wide objectives, such as traffic engineering requires complex translation of global objectives to configuration information in numerous individual routers. Misconfiguration or uncoordinated configuration can result in poor performance or network instability.

The enormous success of the Internet has led to constant development and deployment of new features and services that have increasingly placed its technical foundations under stress. This has given credence to the notion that re-architecting the current distribution of functions in an IP network would lead to significant benefits in network stability, simplification of network operations, and flexibility in introduction of new network protocols and services.

Many advanced network management tasks, such as routing policy enforcement and traffic engineering would benefit significantly from the availability of a network-wide view. For instance, several common BGP-induced network stability and operations problems would be solved by moving BGP from individual routers to a single entity with autonomous system (AS)-wide scope. Similarly, many management functions require a network-wide view, without which a network can exhibit oscillation and poor stability. However, network-wide control is difficult and cumbersome to achieve in today's network of autonomous and complex routers.

In the traditional router architectures, the implementation deeply intertwines control and forwarding functions. There is a need to deconstruct routers to keep most of the network entities as dumb as possible by reducing their function to support only a few canonical packet forwarding functions and migrate all control protocols and non-forwarding related state and control processing to a few smart network-based control entities with the primary function of network-wide control. Furthermore, there is a need to separate control and data planes to provide secure communication in the control plane.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An embodiment of an exemplary SoftRouter architecture deconstructs routers by separating the implementation of control plane functions from packet forwarding functions. Other embodiments of network architectures that achieve this deconstruction are also within the scope of this invention. The present invention encompasses the concept of this deconstruction and its implications for network architecture. In the exemplary SoftRouter architecture, all control plane functions are implemented on separate control entities that are not required to be co-located with the forwarding engines. By migrating all non-forwarding related state and control processing to a few network-based control entities, simpler implementation of network-wide objectives are possible, because coordinated configuration changes are required at only a few smart network elements, instead of all the network elements in an AS. In addition, the association between controllers and the forwarding engines is dynamic, allowing flexible control of a forwarding engine by any control entity that is capable of doing so.

The exemplary SoftRouter architecture includes a dynamic binding protocol for establishing and maintaining dynamic bindings between forwarding entities and the control entities in the network. Intra-domain and inter-domain routing is adapted in the exemplary SoftRouter architecture with improved performance, including improved performance for the intra-domain protocol OSPF.

An exemplary embodiment of an exemplary SoftRouter architecture is an approach to disaggregating the complex IP functions demanded by emerging applications. SoftRouter centralizes and allows sharing of complexity. SoftRouter enables scalable introduction of new functions without unduly encumbering IP forwarding functions.

Figure 2:
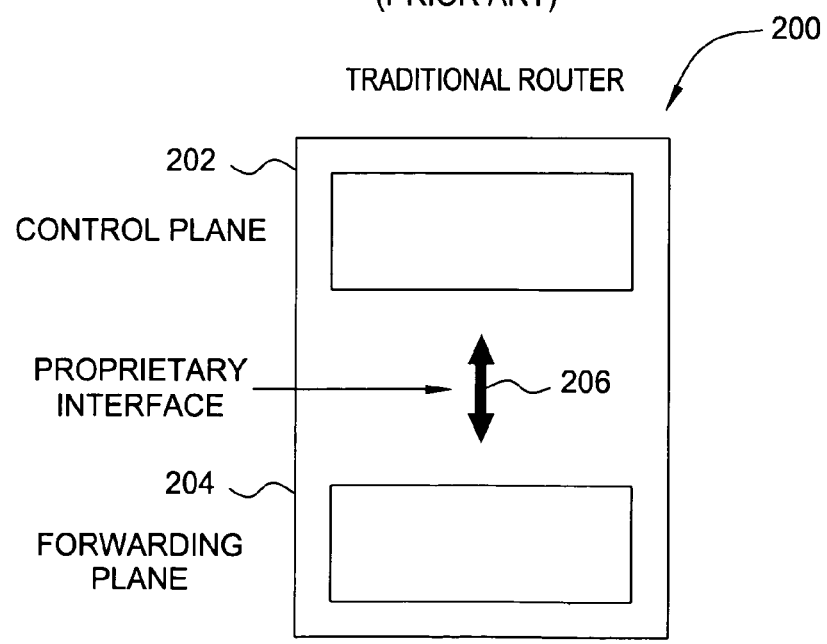
FIG. 2 is a block diagram showing a traditional router.

FIG. 2 shows a traditional router 200 having integrated control and transport planes. The traditional router 200 has software 202 and hardware 204 communicating through a proprietary interface 206.

Figure 3:
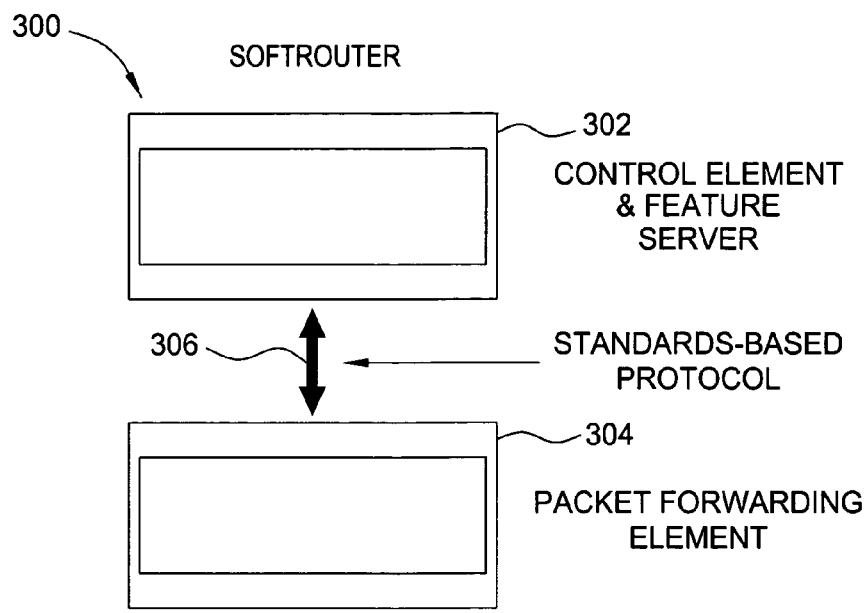
FIG. 3 is a block diagram showing an exemplary SoftRouter architecture.

By contrast, FIG. 3 shows an exemplary SoftRouter architecture 300 that disaggregates the control and transport planes in separate hardware that communicate using standard protocols. The SoftRouter architecture 300 has a control element and features server component 302 and a packet forwarding element component 304 that communicate using a standards-based protocol 306.

Figure 4:
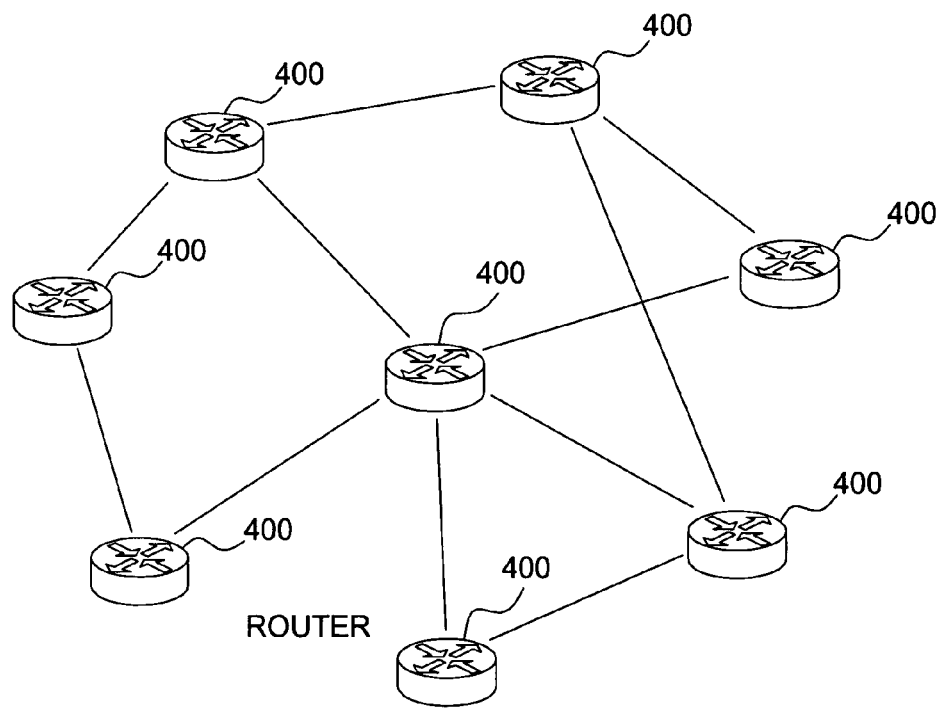
FIG. 4 is a block diagram showing a network with traditional router architecture.

FIG. 4 shows a network with the traditional router architecture, which has a number of interconnected routers 400.

Figure 5:
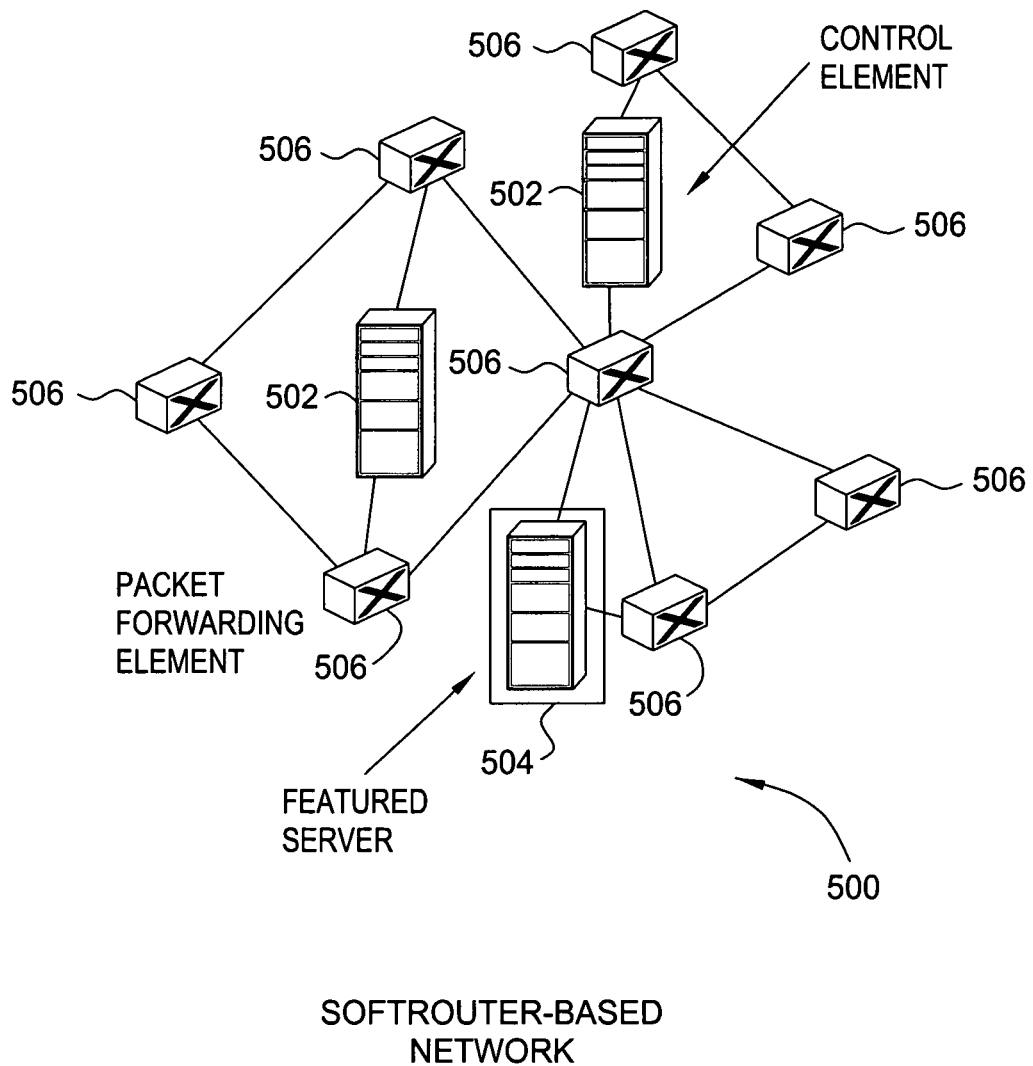
FIG. 5 is a block diagram showing an embodiment of a network with the exemplary SoftRouter architecture.

FIG. 5 shows an embodiment of a network with the exemplary SoftRouter architecture 500. In this embodiment of the exemplary SoftRouter architecture 500, the software servers include control elements (CEs) 502 and feature servers (FSs) 504. CEs 502 are responsible for traditional routing, e.g., for both interior gateway protocol (IGP) (e.g., open shortest path first (OSPF)) and exterior gateway protocol (EGP) (e.g., border gateway protocol (BGP)). FSs 504 are responsible for value-added functions and network-based applications, e.g., QoS, VPN, and mobile IP. Both CEs 502 and FSs 504 interface to forwarding elements (FEs) 506. CEs 502 and FSs 504 may have additional interfaces to each other. The exemplary SoftRouter architecture separates and centralizes the software-based route controller (SoftRouter) from hardware-based transport and packet forwarding.

Deconstructing routers in the exemplary SoftRouter architecture separates the control and forwarding functions. This separation is more than logical (e.g., the use of a well-defined interface with a modular application programming interface (API)); in fact, the control is physically separated (i.e., executed in a distinct network element) and possibly multiple hops from where the forwarding is performed.

A FE 506 is a network element that performs the actual forwarding and switching of traffic. In construction, a FE 506 is similar to a traditional router in that it may have multiple line cards, each in turn terminating multiple ports, and a switch fabric for shuttling data traffic from one line card to another. However, a FE 506 is different from a traditional router, because there is an absence of any sophisticated control logic (e.g., a routing process like OSPF or BGP) running locally. Instead, the control logic is hosted remotely.

A CE 502 is a general purpose computing element, such as a server. It connects to the network like an end host, except that it is typically multi-homed to the network via multiple FEs 506, so that it is not disconnected from the network when a single link fails. A CE 502 runs the control logic on behalf of FEs 506 and, hence, controls them. Any control logic typically found on a traditional router can be migrated to the CEs 502, including routing protocols like OSPF and BGP as well as protocols such as resource reservation protocol (RSVP), label distribution protocol (LDP), Mobile IP, and the like.

An FE 506 functions to forward data traffic between its links. This function may take various forms, such as packet forwarding, label switching, and optical switching, among others. Packet forwarding includes both layer 2 (medium access control (MAC)-based switching) and layer 3 (longest-prefix match) forwarding. Label switching includes, for example, MPLS forwarding. The data-path forwarding functions can include label-swapping, pushing, and popping. In optical switching, the traffic can be time-switched, wavelength-switched, or space-switched among the links. In each of these cases, the switching function is driven by a simple local table that is computed and installed by a CE 502 in the network. Thus, the ability of a FE 506 to do its work based only on a local data structure means the FE 506 is designed to be dumb and fast, while the more complex logic is relegated to a remote, yet smart CE 502.

Both FEs 506 and CEs 502 are understood as logical entities, in addition to physical network elements. Specifically, a FE 506 is logically defined as a collection of ports where traffic can be switched among one another. For example, a FE 506 may include all ports on a single line card, in which case the whole physical packet switch is made up of multiple logical FEs 506. An FE 506 can also span more than one physical switch; however a CE can control multiple FEs. Similarly, a CE 502 can be understood as a logical process instantiated for providing control on behalf of FEs and can be distinguished from the server machine that actually executes it. In particular, a physical CE server machine (PCE) can host multiple CE 502 processes, each serving a different collection of FEs 506. Vice-versa, it is also possible for multiple CE 502 processes (each instantiated for a different control purpose such as interior gateway protocol (IGP) and exterior gateway protocol (EGP)) serving the same FE 506 to be hosted on distinct PCEs. The physical and logical definitions of FEs 506 and CEs 502 are used interchangeably.

Figure 6:
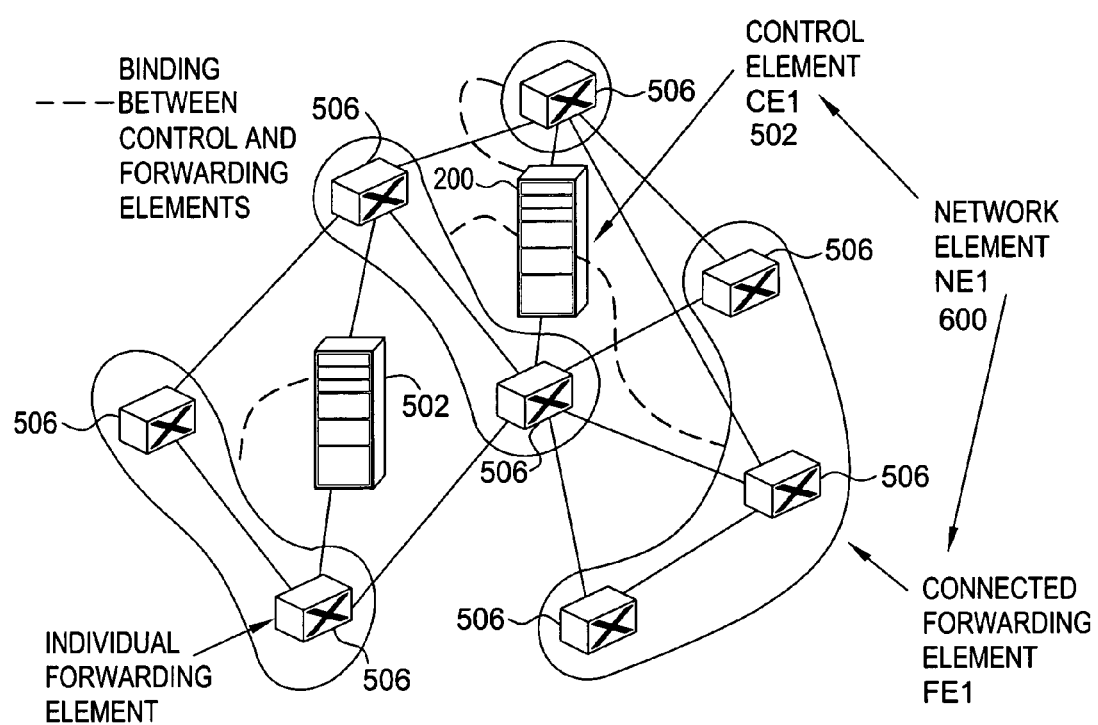
FIG. 6 is a block diagram showing an embodiment of the exemplary SoftRouter architecture illustrating network elements.

FIG. 6 shows an embodiment of the exemplary SoftRouter architecture illustrating network elements 600. Although the notion of a router is not strictly needed in the exemplary SoftRouter architecture, it is useful to regain some equivalent notion in order to understand the routing view of a network. To this end, the concept of a network element (NE) 600 is defined at a high level as a logical grouping of FEs 506 and the respective CEs 502 that control those FEs 506. A particular NE 600 grouping implicitly classifies each link between FEs as either internal (or intra-NE) or external (or inter-NE). An internal link connects two ports belonging to the same NE 600 and an external link connects two ports belonging to different NEs 600. The concept of NE 600 is useful when intra-NE and inter-NE routing follow different approaches.

Without additional restrictions, the above definition of NE 600 allows flexibility. For example, this definition allows two FEs 506 in disjoint parts of a network to belong to the same NE 600. It also allows for a traditional router model where the FE 506 includes exactly all the ports in the physical element and the controlling CE(s) 502 are collocated on the same element.

In clustered routing, the FEs 506 making up a NE 600 are part of a contiguous cloud. In other words, all ports of the NE 600 are reachable from each other via links internal to the NE 600. Physically, this represents the clustering of neighboring physical FEs 506 into a single NE 600. A typical scenario is that of several routers being connected back-to-back in a central office. From a routing perspective, this clustering-based definition of the NE 600 can provide significant simplification. The reduced number of NEs 600 in the routing view reduces the inter-NE routing complexity and a different, possibly less complex routing protocol can be employed for intra-NE routing.

The control relationship between an FE 506 and a CE 502 is formally called a binding. More precisely, a binding between a FE 506 and a CE 502 means that the CE 502 is performing particular control functions on behalf of the FE 506. Because multiple protocols (e.g., IGP and EGP, or even multiple instances of a protocol) may be required for the operation of a FE 506, a FE 506 may have multiple CE 502 bindings.

The exemplary SoftRouter architecture includes various protocols. A number of different protocols are used for the operation of a network designed according to the exemplary SoftRouter architecture, including dynamic binding protocol and FE/CE transport protocol. The binding between a FE 506 and a CE 502 is established via a protocol that discovers CEs 502 and FEs 506 and also maintains these bindings in the face of network disruptions. In the most general case of the dynamic binding protocol, an FE 506 can bind to any available CE 502 and a CE 502 can perform control functions for any FE 506, thus yielding maximal resiliency and minimal configuration overhead. This dynamic binding ability is a feature of the concept of deconstructed routers that have separate control and forwarding functions. The FE/CE transport protocol has two parts, namely data and control. For the data part, the FE/CE transport protocol supports tunneling of routing protocol packets between FEs 506 and CEs 502 so that a routing protocol packet received by an FE 506 can be sent to a CE 502 for processing. For the control part, once a binding is established, the FEs 506 and the CEs 502 use the FE/CE transport protocol to communicate state information and perform control. On the uplink (FE 506 to CE 502) direction, this control part provides link and forwarding state information (e.g., link up/down signal) to the CE 502. On the downlink direction, the FE/CE transport protocol carries configuration and control information (e.g., enable/disable a link, forwarding information base (FIB)). Known protocols, such as forwarding and control element separation (ForCES) may be used for the FE/CE transport protocol.

The exemplary SoftRouter architecture includes two features: dynamic binding and the degree of distributed control. In the exemplary SoftRouter architecture, a FE 506 can dynamically bind to any CE 502 on the network at any time and vice-versa. This provides an increased degree of freedom in the design and deployment of the control plane that, in turn, leads to improvement in resiliency, operational complexity, scalability, management, and security. In contrast, the static bindings in the traditional model make it less reliable and less flexible with respect to redesigning the Internet control plane. Distributed control provides benefits such as resiliency, but can also lead to certain network instabilities. For example, the use of route reflectors in BGP can have oscillation problems and flooding-based link-state protocols, such as OSPF can cause update storms due to multiple failures. The exemplary SoftRouter architecture allows a varying degree of distributed control. Specifically, embodiments of the exemplary SoftRouter architecture implement different degrees of distributed control by varying how FEs 506 are clustered and how control is aggregated on the CEs 502. Fewer control points mean higher vulnerability to failure conditions such as network partitioning, but potentially better network stability. Both traditional fully distributed routing and completely centralized routing are merely two extreme implementations of many possible embodiments of the exemplary SoftRouter architecture.

The dynamic binding feature of the exemplary SoftRouter architecture allows for a FE 506 to be separated by multiple hops from a CE 502. This flexibility comes at the expense of increased complexity in the initial configuration of the forwarding elements. In the SoftRouter model, upon bootup, the FE 506 obtains its configuration information, including the IP addresses of its interfaces from a remote CE 502 that resides on a server. This poses a potential paradox: in order to discover a CE 502 and send packets to it, the FE 506 requires routing information; however, the routing information is supposed to come from the CE 502. This paradox is resolved using a discovery protocol that is part of the exemplary SoftRouter architecture. This discovery protocol lets FEs 506 and CEs 502 discover each other and maintain a routable path between these entities. The dynamic binding process also supports enhanced features, such as CE 502 load balancing, constrained clustering algorithms that improve CE-FE binding resiliency and failover, increasing the availability for the network. These features also enable better network planning and better network-wide control.

Embodiments of the dynamic binding protocol provide binding service for FEs 506 and routing services for FE-CE messages. The dynamic binding protocol runs continuously on all the elements (FEs 506 and CEs 502) for the lifetime of the network as a separate protocol, independent of other protocols that operate in the network. At the minimum, each FE 506 and CE 502 has a pre-configured octet string (FEID/CEID) that acts as a unique identifier. In a bridged network of FEs 506 and CEs 502 (for example, connected over Ethernet), a rapid spanning tree protocol provides the connectivity for FE-CE communication. Because such networks are not the only one possible given the heterogeneous FE 506 possibilities, the dynamic binding protocol includes a separate component for supporting routing services between the CEs 502 and the FEs 506. However, if a spanning tree protocol is available, the dynamic binding protocol can make use of it for routing services. The dynamic binding protocol has four components: discovery, association, failure detection with repair, and transport tunnels.

The discovery component of the dynamic binding protocol enables a FE 506 to discover a CE 502 that can manage it. This CE 502 is called the managing-CE for that FE 506. In order for the discovery component to provide rapid convergence for the configuration process, CE 502 information is distributed all over the network, enabling FEs 506 to dynamically bind to the best CE 502 using bindings that are either pre-configured by the network administrator or obtained using distributed clustering algorithms.

A source-routed routing layer helps in the discovery process. At the time of bootup, each FE 506 uses a randomly chosen temporary IP address along with the FEID to perform pre-discovery routing. This address is chosen from a controlled address space, for example a private subnet address. The CEs 502 are pre-configured and, hence, have a valid IP address. All messages are broadcast on all interfaces of the FE 506 and the CE 502.

FEs 506 and CEs 502 discover each other by advertising their presence to their immediate neighbors by periodic broadcasts. Each node (FE/CE) thus maintains a list of neighbors in a local table. FEs 506 also periodically solicit CE 502 information from all neighbors in order to collect up-to-date information on the CEs 502 in the network. In response, neighboring FEs/CEs respond with a list of CEs that are known to them. Each CE 502 in the list is also associated with a known source-route to the CE 502 from the neighboring FE/CE. By associating each entry with a time-to-live parameter, it is ensured that CE 502 information is periodically refreshed with the best path to reach the CE 502. Each node uses the source-route with the shortest hop-count to contact a CE 502. The discovery process runs all the time in a network designed according to the exemplary SoftRouter architecture.

Each FE 506 is assigned one primary-CE and at least one backup-CE by the network administrator during planning. This information is configured in the CEs 502 and, optionally, in the FEs 506. Typically, this assignment is made a priori by taking into account factors, such as the load on the CE 502, the distance between the CE 502 and the FE 506, and the reliability of the links between them. Thus, when a CE 502 is contacted by a FE 506, the CE 502 lets the FE 506 know the identity of its primary-CE and backup-CE, if this information is available, or accepts the FE 506 if it can manage it. If not accepted, the FE 506 then proceeds to contact its primary-CE or backup-CE.

The exemplary SoftRouter architecture includes the following three aspects: decoupling, servers, and standard interfaces. Decoupling refers to the separation of the complex control plane that includes processing functions (e.g., routing protocol processing) from the packet forwarding plane. Servers refer to the implementation of control plane processing functions on dedicated external control plane servers. Standard interfaces refer to the definition of a standard protocol for the interface between the control plane and the packet forwarding plane.

The control plane in a NE 600 is involved in executing various routing, signaling, and other control operations, such as applying policies, filters and the like, in addition to configuring the forwarding plane of the device. Therefore, the proper functioning of a network implemented according to the exemplary SoftRouter architecture is directly related to the proper functioning of the control plane. Thus, to function properly, the network needs control plane security, control plane scalability, and control plane availability. Control plane security includes protection from attacks, snooping, and other threats. Control plane scalability is needed to keep the network operating correctly as the network size increases. A highly available control plane implies a highly reliable network, which is needed for real-time services such as Internet telephony, video, and other applications.

An exemplary network that is based on the exemplary SoftRouter architecture satisfies the above needs. Although some current generation routers/switches do decouple the control plane processing functionality from the forwarding plane functionality, it is still quite tightly coupled to the device as a whole. Further, all control plane traffic from one controller to another controller continues to traverse the data paths (known as in-band control).

One advantage of the exemplary SoftRouter architecture is the ability to completely decouple the control plane from the data plane, including the path traversed by the control plane traffic. In other words, it is possible to have a separate control plane network (controller network) that has controllers that communicate with each other (CE-CE communication) over a physically separate network (known as out-of-band control) with no control packets traversing the data path.

Figure 7:
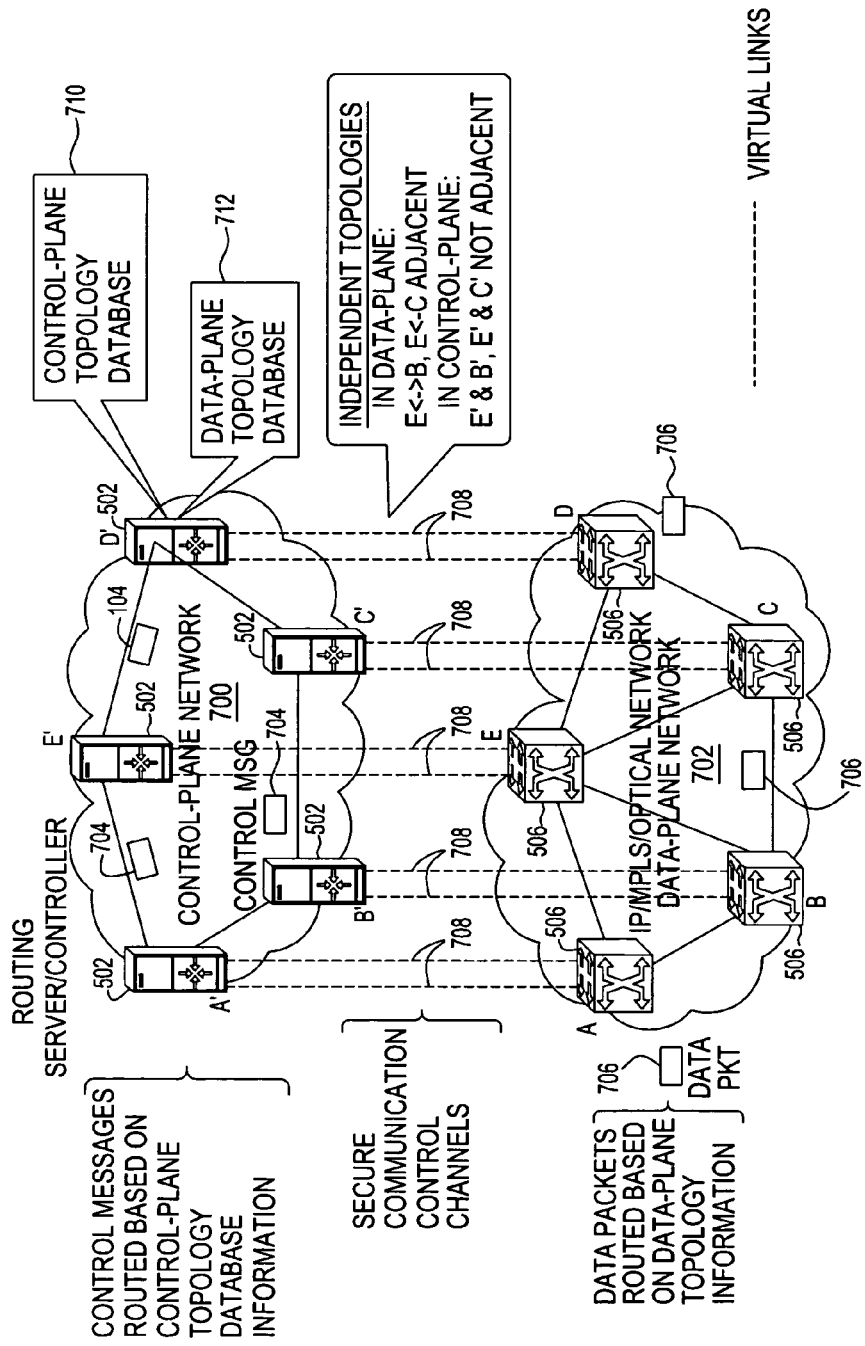
FIG. 7 is a block diagram showing an embodiment of the exemplary SoftRouter architecture.

FIG. 7 is a block diagram showing an embodiment of the exemplary SoftRouter architecture. There are two physically separate networks, a control plane network 700 and a data plane network 702. The data plane network 702 is one physical network for the data traffic, while the control plane network 700 is another physical network for the control traffic. The topology of the data plane network 702 is made up of interconnected FEs 506. The topology of the control plane network 700 is made up interconnected CEs 502. This physical independence of the control plane network 700 from the data plane network 702 provides for a secure mechanism to communicate among the CEs 502 in the control plane network 700. In addition, this physical independence provides improved reliability and improved scalability, when compared to the traditional router architecture, where control plane message are in-band with the data plane.

FIG. 7 is a virtual representation of servers. In the control plane network 700, there are CEs 502, which are labeled A', B', C', D', and E', in an exemplary topology, but other topologies are also within the scope of the present invention. The topologies of the control plane network 700 and the data plane network 702 are independent. In the data plane network 702, there are FEs 506, which are labeled A, B, C, D, and E, in a different exemplary topology, but other topologies are also within the scope of the present invention. The exemplary data plane network 702 shown in FIG. 7 is an Internet protocol (IP)/multiprotocol label switching (MPLS)/optical network, but many other kinds of networks are also within the scope of the present invention. In the data plane network 702, E<->B, E<->C are adjacent. In the control plane network 700, E'&B', E'&C' are not adjacent. Although FIG. 7 shows the same number of CEs 502 as FEs 506, a typical implementation based on the exemplary SoftRouter architecture preferably has fewer CEs 502 than FEs 506.

In FIG. 7, control messages 704 are passed among CEs 502 on the control plane network 700 and data packets 706 are passed among FEs 506 on the data plane network 702. There is secure communications between CEs 502. In some embodiments, the control plane network 700 includes one or more feature servers (FSs) (not shown) in addition to CEs 502. Control messages 704 are routed based on the topology database information 710 associated with the control plane network 700. Data packets 706 are routed based on the topology database information 712 associated with the data plane network 702. In addition, there is a standard interface 708 between the control plane network 700 and the data plane network 702.

This embodiment of the exemplary SoftRouter architecture also includes some routing protocol enhancements. Because there are two independent networks, the routing protocols need to keep track of two independent network topologies, one for the data plane network 702 and another for the control plane network 700. The topologies of the data plane network 702 and the control plane network 700 need not be the same. Routing protocol adjacencies are established between any two control elements appropriately based on the underlying topology of the data plane network 702, properly capturing the topology view of the data plane network 700. Any changes or failures of the topology of the data plane network 702 are communicated back to the CEs 502 in a timely manner, because they affect routing.

As an example, an interior gateway protocol (IGP), such as open shortest path first (OSPF) uses hello messages to determine the states of the links and any changes to the link (i.e., interface) state causes updates to be generated and flooded throughout the network to other OSPF peers. In this embodiment of the exemplary SoftRouter architecture, OSPF may continue to send hello messages over data path links to determine their states. However, any changes to the link states (link state update packets) communicated by a FE 506 to a CE 502 may directly be flooded to other OSPF peers (i.e., other CEs 502) over the separate control plane network 700, without having to go though the data plane network 702. This can even lead to faster convergence of the link state database, because the flooding is taking place only over the separate control plane network 700, which is preferably smaller than the underlying data plane network 702. The link states of the control plane network 700 itself are monitored by either the same or a different instance of the IGP protocol and any failures in links will lead to rerouting of the packets through alternate routes.

This embodiment of the exemplary SoftRouter architecture has independent topologies for the control plane network 700 and data plane network 702. The control plane network 700 is only between the set of CEs. The independent control plane network 700 is preferably smaller than the underlying topology of the data plane network 702. Each CE in the control plane network 700 has a full view of the topology of the data plane network 702. All protocols of the control plane network 700 (e.g., OSPF, intermediate system to intermediate system (IS-IS), routing information protocol (RIP), border gateway protocol (BGP), MPLS) that require controller-to-controller (i.e., CE-to-CE) communication directly use the separate control plane network 700 to send control packets. There is improved security due to out-of-band control communication and improved reliability, because failures in data links/nodes do not affect communication between CEs 502. There is improved scalability, because the convergence of protocols can be faster. Link state protocols, such as OSPF and IS-IS can converge faster, because the control plane network 700 over which the flooding takes place is smaller than the underlying data plane network 702.

In this embodiment of the exemplary SoftRouter architecture, CE-to-CE communication is through a private network, i.e., the control plane network 700. By contrast, in other embodiments of the exemplary SoftRouter architecture, CE-to-CE communication of control messages 704 may use data paths in the data plane network 702. For example, in other embodiments, a control message 704 may take a path from a CE 502 to a FE 506 to another CE 502. By contrast, in this embodiment, all control messages 704 between CEs 502 take paths within the control plane network 700. There are private links from one CE 502 to another CE 502, so that control messages 704 do not need to go through any FEs 506. This improves security and reliability over other embodiments, because control traffic is privatized and not available to the external world. However, the CEs 502 can communicate with FEs 506 through the standard interface 108. For example, a CE 502 can configure and provide routing information to a FE 506 through the standard interface 708. The standard interface 708 may be physical or virtual links (i.e., not necessarily physical links). A virtual link is a tunnel through physical links.

Some examples of applications of this exemplary embodiment include voice over IP (VOIP), military applications, and any other applications where a private network for control messages is advantageous.

Figure 8:
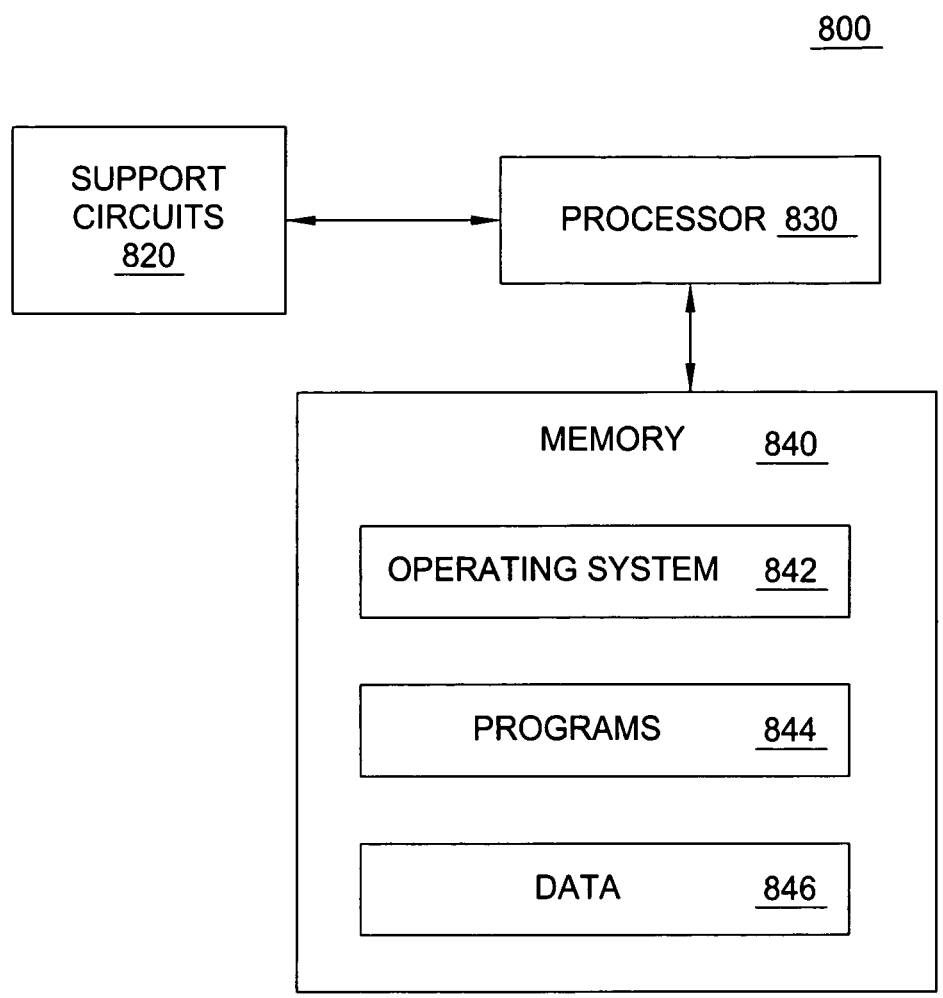
FIG. 8 is a high level block diagram showing a computer. To facilitate understanding, identical reference numerals have been used, where possible, to designate identical elements that are common to the figures.

FIG. 8 is a high level block diagram showing a computer. The computer 800 may be employed to implement embodiments of the present invention. The computer 800 comprises a processor 830 as well as memory 840 for storing various programs 844 and data 846. The memory 840 may also store an operating system 842 supporting the programs 844.

The processor 830 cooperates with conventional support circuitry such as power supplies, clock circuits, cache memory and the like as well as circuits that assist in executing the software routines stored in the memory 840. As such, it is contemplated that some of the steps discussed herein as software methods may be implemented within hardware, for example, as circuitry that cooperates with the processor 830 to perform various method steps. The computer 800 also contains input/output (I/O) circuitry that forms an interface between the various functional elements communicating with the computer 800.

Although the computer 800 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A network architecture, comprising:
a data plane being a network for carrying data traffic, the data plane including a plurality of forwarding elements (FEs) interconnected to each other;
a control plane being another network for control traffic that is separate from the data plane, the control plane including a plurality of control elements (CEs) interconnected to each other and multiple feature servers (FSs), each CE controls at least two of the FEs and is dynamically bound to said at least two controlled FEs, so that each FE is adapted to discover a corresponding CE to control said each FE, and each FS is interfaced with multiple FEs; and
an interface between the data plane and the control plane using a protocol, wherein the control plane being physically separate from the data plane comprises private links between the CEs to thereby enable out-of-band control communication therebetween,
wherein each FS is adapted to add a value-added functionality including one or more network-based applications comprising any of: a Quality of Service (QoS) application, a multicast application, a Virtual Private Network (VPN) application and a mobility application,
wherein routing protocols keep track of data plane and control plane topologies and any change or failure in the data plane topology is communicated to the CEs.

2. The network architecture of claim 1, wherein any CE configures and provides routing information to one of the plurality of FEs controlled by said any CE through a standard interface, while control messages between the CEs are sent through a private control plane.

3. The network architecture of claim 1, wherein the control plane is logically separate from the data plane.

4. The network architecture of claim 1, wherein said each FE processes traffic in response to a control logic of at least the corresponding dynamically bound CE.

5. The network architecture of claim 1, wherein at least one of the plurality of CEs dynamically bound to one of said at least two FEs reaches the one FE via multiple control plane hops.

6. The network architecture of claim 1, wherein said each CE is multi-homed to said another network via multiple FEs.

7. The network architecture of claim 1, wherein said each FE comprises a logical collection of physical ports of a switching device for controllably switching a traffic therebetween, and said each CE comprises a logical process instantiated at a server for providing a control logic for at least one of the at least two dynamically bound FEs.

8. The network architecture of claim 1, wherein said each of the FSs interfaces to at least one CE.

9. The network architecture of claim 1, wherein said each FS is adapted to manage a plurality of network applications.

10. The network architecture of claim 1, wherein a traffic associated with a network-based application is transported at a FE supporting the network-based application according to a control logic of a corresponding CE dynamically bound to the FE, the FE being one of the plurality of FEs.

11. The network architecture of claim 1, wherein said each CE provides a control logic for adapting transport of traffic at the respective controlled FEs.

12. A network architecture, comprising:
a plurality of forwarding elements (FEs) interconnected via a data plane network, each FE processing respective traffic for subsequent transport via said data plane network, said respective traffic including traffic associated with network-based applications;
a plurality of control elements (CEs) interconnected via a control plane network separate from said data plane network, each CE being dynamically bound to and controlling thereby at least two FEs, so that each FE is adapted to discover a corresponding CE to control said each FE;
multiple feature servers (FSs) adapted to communicate with at least some of the CEs via said control plane network, each FS interfacing with multiple FEs managing one or more network-based applications; and
an interface between the data plane network and the control plane network to enable communication between CEs and FEs,
wherein each FS is adapted to add a value-added functionality including one or more network-based applications comprising any of: a Quality of Service (QoS) application, a multicast application, a Virtual Private Network (VPN) application and a mobility application, wherein routing protocols keep track of data plane and control plane topologies and any change or failure in the data plane topology is communicated to the CEs.

13. A network architecture, comprising:

a data plane being a network for carrying data traffic, the data plane including a plurality of forwarding elements (FEs) interconnected to each other;

a control plane being another network for control traffic that is separate from the data plane, the control plane including a plurality of control elements (CEs) interconnected to each other and multiple feature servers (FSs), each CE controls at least two of the FEs and is dynamically bound to said at least two controlled FEs, so that each FE is adapted to discover a corresponding CE to control said each FE, and each FS is interfaced with multiple FEs; and an interface between the data plane and control plane using a protocol, wherein the control plane being physically separate from the data plane comprises private links between the CEs to thereby enable out-of-band control communication therebetween, wherein each FS is adapted to add value-added functionality including one or more network-based applications comprising any of: a Quality of Service (QoS) application, a multicast application, a Virtual Private Network (VPN) application and a mobility application, wherein each transport protocol implemented at an FE is associated with a respective dynamically bound CE.

14. The network architecture of claim 13, wherein routing protocols keep track of data plane and control plane topologies and any change or failure in the data plane topology is communicated to the CEs.

15. The network architecture of claim 13, wherein any CE configures and provides routing information to one of the plurality of FEs controlled by said any CE through a standard interface, while control messages between the CEs are sent through a private control plane.

16. The network architecture of claim 13, wherein the control plane is logically separate from the data plane.

17. The network architecture of claim 13, wherein said each FE processes traffic in response to a control logic of at least the corresponding dynamically bound CE.

18. The network architecture of claim 13, wherein at least one of the plurality of CEs dynamically bound to one of said at least two FEs reaches the one FE via multiple control plane hops.

19. The network architecture of claim 13, wherein said each CE is multi-homed to said another network via multiple FEs.

20. The network architecture of claim 13, wherein said each FE comprises a logical collection of physical ports of a switching device for controllably switching a traffic therebetween, and said each CE comprises a logical process instantiated at a server for providing a control logic for at least one of the at least two dynamically bound FEs.

21. The network architecture of claim 13, wherein said protocol comprises any of an Interior Gateway Protocol (IGP) and an Exterior Gateway Protocol (EGP).

22. The network architecture of claim 13, wherein said each of the FSs interfaces to at least one CE.

23. The network architecture of claim 13, wherein said each FS is adapted to manage a plurality of network applications.

24. The network architecture of claim 13, wherein a traffic associated with a network-based application is transported at a FE supporting the network-based application according to a control logic of a corresponding CE dynamically bound to the FE, the FE being one of the plurality of FEs.

25. The network architecture of claim 13, wherein said each CE provides control logic for adapting transport of traffic at the respective controlled FEs.

26. The network architecture of claim 13, wherein at least two of said plurality of CEs are adapted to control respective protocols associated with a common dynamically bound FE.

27. A network architecture, comprising:

a data plane being a network for carrying data traffic, the data plane including a plurality of forwarding elements (FEs) interconnected to each other;

a control plane being another network for control traffic that is separate from the data plane, the control plane including a plurality of control elements (CEs) interconnected to each other and multiple feature servers (FSs), each CE controls at least two of the FEs and is dynamically bound to said at least two controlled FEs, so that each FE is adapted to discover a corresponding CE to control said each FE, and each FS is interfaced with multiple FEs; and an interface between the data plane and the control plane using a protocol, wherein the control plane being physically separate from the data plane comprises private links between the CEs to thereby enable out-of-band control communication therebetween, wherein each FS is adapted to add a value-added functionality including one or more network-based applications comprising any of: a Quality of Service (QoS) application, a multicast application, a Virtual Private Network (VPN) application and a mobility application, wherein at least two of said plurality of CEs are adapted to control respective protocols associated with a common dynamically bound FE.

28. The network architecture of claim 27, wherein said protocol comprises any of an Interior Gateway Protocol (IGP) and an Exterior Gateway Protocol (EGP).

29. The network architecture of claim 27, wherein any CE configures and provides routing information to one of the plurality of FEs controlled by said any CE through a standard interface, while control messages between the CEs are sent through a private control plane.

30. The network architecture of claim 27, wherein the control plane is logically separate from the data plane.

31. The network architecture of claim 27, wherein said each FE processes traffic in response to a control logic of at least the corresponding dynamically bound CE.

32. The network architecture of claim 27, wherein at least one of the plurality of CEs dynamically bound to one of said at least two FEs reaches the one FE via multiple control plane hops.

33. The network architecture of claim 27, wherein said each CE is multi-homed to said another network via multiple FEs.

34. The network architecture of claim 27, wherein said each FE comprises a logical collection of physical ports of a switching device for controllably switching a traffic therebetween, and said each CE comprises a logical process instantiated at a server for providing a control logic for at least one of the at least two dynamically bound FEs.

35. The network architecture of claim 27, wherein said each of the FSs interfaces to at least one CE.

36. The network architecture of claim 27, wherein said each FS is adapted to manage a plurality of network applications.

37. The network architecture of claim 27, wherein a traffic associated with a network-based application is transported at a FE supporting the network-based application according to a control logic of a corresponding CE dynamically bound to the FE, the FE being one of the plurality of FEs.

38. The network architecture of claim 27, wherein said each CE provides a control logic for adapting transport of traffic at the respective controlled FEs.

39. The network architecture of claim 27, wherein routing protocols keep track of data plane and control plane topologies and any change or failure in the data plane topology is communicated to the CEs.

40. A network architecture, comprising:
a plurality of forwarding elements (FEs) interconnected via a data plane network, each FE processing respective traffic for subsequent transport via said data plane network, said respective traffic including traffic associated with network-based applications;
a plurality of control elements (CEs) interconnected via a control plane network separate from said data plane network, each CE being dynamically bound to and controlling thereby at least two FEs, so that each FE is adapted to discover a corresponding CE to control said each FE;
multiple feature servers (FSs) adapted to communicate with at least some of the CEs via said control plane network, each FS interfacing with multiple FEs managing one or more network-based applications; and
an interface between the data plane network and the control plane network to enable communication between CEs and FEs,
wherein each FS is adapted to add a value-added functionality including one or more network-based applications comprising any of: a Quality of Service (QoS) application, a multicast application, a Virtual Private Network (VPN) application and a mobility application,
wherein each transport protocol implemented at said each FE is associated with the corresponding dynamically bound CE.

41. A network architecture, comprising:
a plurality of forwarding elements (FEs) interconnected via a data plane network, each FE processing respective traffic for subsequent transport via said data plane network, said respective traffic including traffic associated with network-based applications;
a plurality of control elements (CEs) interconnected via a control plane network separate from said data plane network, each CE being dynamically bound to and controlling thereby at least two FEs, so that each FE is adapted to discover a corresponding CE to control said each FE;
multiple feature servers (FSs) adapted to communicate with at least some of the CEs via said control plane network, each FS interfacing with multiple FEs managing one or more network-based applications; and
an interface between the data plane network and the control plane network to enable communication between CEs and FEs,
wherein said each FS is adapted to add value-added functionality including one or more network-based applications comprising any of: a Quality of Service (QoS) application, a multicast application, a Virtual Private Network (VPN) application and a mobility application,
wherein at least two of said plurality of CEs are adapted to control respective protocols associated with a common dynamically bound FE.

* * * * *